United States Patent [19]
Hobes

[11] Patent Number: 5,356,998
[45] Date of Patent: Oct. 18, 1994

[54] GRAFT POLYMER BASED ON ULTRAHIGH MOLECULAR WEIGHT POLYETHYLENE

[75] Inventor: John Hobes, Dinslaken, Fed. Rep. of Germany

[73] Assignee: Hoechst Aktiengesellschaft, Fed. Rep. of Germany

[21] Appl. No.: 105,466

[22] Filed: Aug. 9, 1993

Related U.S. Application Data

[63] Continuation of Ser. No. 761,301, Sep. 17, 1991, abandoned.

[30] Foreign Application Priority Data

Sep. 27, 1990 [DE] Fed. Rep. of Germany ....... 4030564

[51] Int. Cl.$^5$ ............................................ C08F 267/04
[52] U.S. Cl. ...................... 525/285; 525/70; 525/301; 525/302
[58] Field of Search ................ 525/70, 285, 301, 302

[56] References Cited

U.S. PATENT DOCUMENTS 3,306,875 2/1967 Hay .
4,957,974 9/1990 Ilenda et al. ................ 525/301

FOREIGN PATENT DOCUMENTS 173572 3/1986 European Pat. Off. ..... C08F 255/02
300718 1/1989 European Pat. Off. ..... C08F 255/00

OTHER PUBLICATIONS

Patent Abstracts of Japan, vol. 11, No. 259(C–441) (2706); Aug. 21, 1987, JPA–62–59637; Mar. 16, 1987.

Primary Examiner—John Kight, III
Assistant Examiner—Terressa M. Mosley
Attorney, Agent, or Firm—Jordan B. Bierman

[57] ABSTRACT

A graft polymer based on an ultrahigh molecular weight polyethylene having a molecular weight of at least 1,000,000 g/mol and an alkenecarboxylic acid or alkenecarboxylic anhydride as the graft monomer; the polymer has modified and improved properties compared with ultrahigh molecular weight polyethylene. The preparation and use thereof are also described.

24 Claims, No Drawings

GRAFT POLYMER BASED ON ULTRAHIGH MOLECULAR WEIGHT POLYETHYLENE

This application is a continuation, of application Ser. No. 07/761,301, filed Sep. 17, 1991, now abandoned.

The present invention relates to a graft poller on ultrahigh molecular weight polyethylene as the base polymer and having modified and improved properties compared with ultrahigh molecular weight polyethylene, and to the preparation and use thereof.

BACKGROUND OF THE INVENTION

There have been no lack of attempts in the past to improve the properties of various polyethylenes by additives and/or by means of chemical reactions.

Thus, EP-A-170,790 describes a composition which, in addition to ultrahigh molecular weight polyethylene, contains from 0.1 to 25% by weight, based on the polyethylene, of an organic carboxylic acid containing at least 2 carboxyl groups and from 0.01 to 2.5% by weight, also based on the polyethylene, of a Lewis base. This composition is obtained by mixing the ultrahigh molecular weight polyethylene with the organic carboxylic acid and the Lewis base, in particular zinc stearate or aluminum stearate. This mixture can subsequently be processed at elevated temperatures, for example with the aid of a screw extruder. This type of processing is possible since the organic carboxylic acid and the Lewis base surround the ultrahigh molecular weight polyethylene particles and act as a lubricant during processing.

U.S. Pat. No. 4,147,740 describes a process for the preparation of modified, grafted polyethylene in which polyethylene is mixed with from 0.1 to 1.5% by weight, based on the polyethylene, of an unsaturated polycarboxylic anhydride, in particular maleic anhydride. The components are reacted at from 140° C. to 210° C. as a melt in the presence of an organic peroxide having a half life of at least 60 seconds. However, there is no indication of the use of ultrahigh molecular weight polyethylene in the preparation of modified, grafted polyethylenes.

Ultrahigh molecular weight polyethylene (hereinafter ultra polyethylene) means a polyethylene having a very high degree of polymerization and prepared under low-pressure synthetic conditions using Ziegler catalysts. Its mean average molecular weight, measured viscosimetrically, is at least 1,000,000 g/mol. A number of technically important properties, such as notched impact strength, heat distortion resistance, tear strength at elevated temperature, and wear resistance improve with increasing molecular weight. This combination of features allows ultra polyethylene to be used in areas where high demands are made with respect to stress and load-bearing capacity not only at high temperatures, but also at low temperatures. However, the lack of adhesive strength of ultra polyethylene proves to be disadvantageous in the surface-coating of shaped products.

In order to use ultra polyethylene as a coating material, the surface of the ultra polyethylene is subjected to separate treatment. Flame treatment, roughening, spark discharge, treatment with solvents, or dipping into a pickling bath provides the surface of the ultra polyethylene with an adhesive capacity which facilitates further processing.

There is thus a demand for a substance which has essentially the features of ultra polyethylene, has improved abrasion resistance and, at the same time, has good adhesive capacity without, as described above, the necessity for separate after-treatment.

DESCRIPTION OF THE INVENTION

This object is achieved by a graft polymer containing from 95 to 99.9 parts by weight of polyethylene having a molecular weight of $\geq 1,000,000$ g/mol as the base polymer, and from 5 to 0.1 parts by weight of an alkenecarboxylic acid or alkenecarboxylic anhydride as the graft monomer. The polyethylene present in the graft polymer according to the invention comprises a mixture of uncrosslinked and crosslinked polyethylene onto which the alkenecarboxylic acid or alkenecarboxylic anhydride is grafted. The degree of crosslinking of the polyethylene, i.e. the percentage of crosslinked polyethylene based on all the polyethylene, is from 30 to 98%, in particular from 40 to 95%.

The graft polymer contains 96.0 to 99.5 parts by weight, more preferably 96.5 to 99.0 parts by weight, most preferably 97.0 to 99.0 parts by weight, of polyethylene having a molecular weight of $\geq 1,000,000$ g/mol and 4.0 to 0.5 parts by weight, preferably 3.5 to 1.0 parts by weight, most preferably 3.0 to 1.0 parts by weight, of alkenecarboxylic acid or anhydride. The graft polymer may also contain minor amounts of other added substances, for example additives, stabilizers, or lubricants. The graft polymer according to the invention not only has essentially the properties typical of ultra polyethylene, but also considerably improved abrasion resistance compared to the starting material (base polymer).

The abrasion resistance is determined using the socalled sand slurry test; i.e. a slurry method which is described in greater detail in J. Berzen, CZ-Chemie Technik 3(1974), pages 129 to 134. The experimental arrangement selected here comprises a parallel series of a plurality of chrome-nickel steel abrasion vessels arranged alongside one another and filled with a slurry comprising 2 parts by weight of water and 3 parts by weight of quartz sand of a certain grain size. Rectangular samples (dimensions: 76.2 mm×25.4 mm×6.35 mm) rotate in these vessels. Each sample is attached to a stirring shaft and rotates at a specified speed of, for example, 300, 600, or 1,200 revolutions per minute at a certain distance above the base of the vessel. To prevent the water/sand slurry rotating together with the sample, which would result in a considerable reduction in wear, bars arranged crosswise, which act as flow breakers and ensure turbulence of the water/sand slurry, are located in the abrasion vessel.

The action of the sand causes the sample to undergo wear due to abrasion, which is indicated as a relative volumetric wear value due to the different densities of the materials to be investigated. The wear value here is arbitrarily set at 100 for a certain ultra polyethylene, and the corresponding comparison values are based thereon. A lower relative volumetric wear value corresponds to increased abrasion resistance.

The graft polymer according to the invention furthermore has better adhesive strength than the uncrosslinked ultra polyethylene used as the starting material (base polymer), which has no adhesive power. The adhesive strength is a consequence of the alkenecarboxylic acid or anhydride groups introduced by grafting onto the ultra polyethylene. As the number of these reactive groups increases, so does the adhesive strength, measured as the peel strength. The peel strength is at a maximum, for example at from 2 to 3N, for values of from 0.5 to 5.0 parts by weight of alkenecarboxylic acid or alkenecarboxylic anhydride, in each case based on 100 parts by weight of the total ultra polyethylene and alkenecarboxylic acid or anhydride.

Of the various possibilities of stressing an adhesive bond, such as tension, impact, or peeling, it is primarily the last that is employed to assess the adhesion behavior and thus to determine the adhesive strength. The peel strength is defined as the force required to peel off a certain strip from a polyethylene covering over a defined peel length. It indicates the force per tear length which is required to break the bond. A distinction is made between initial tear force and tear propogation force. The latter is of primary importance for the adhesive strength of a system. The component to be bonded is aluminum sheeting, to which the ultra polyethylene is applied.

The peel strength is determined using a Zwick tensile testing machine (vertical design) in whose clamping jaw the areas ($30 \times 100$ mm$^2$) of the bonded system are clamped at an angle of 90°. The actual adhesive area ($70 \times 100$ mm$^2$) is perpendicular to the clamping jaws. The peel rate is 50 mm/min. The tear or peel forces which occur are recorded.

The graft polymer contains, as the alkenecarboxylic acid (graft monomer), maleic acid, fumaric acid, itaconic acid, crotonic acid, acrylic acid or methacrylic acid, in particular acrylic acid. The graft polymer contains, as the alkenecarboxylic anhydride (graft monomer), maleic anhydride, itaconic anhydride, crotonic anhydride, acrylic anhydride or methacrylic anhydride, in particular maleic anhydride. Particular mention should be made of graft polymers which contain 1 to 3 parts by weight of maleic anhydride per 100 parts by weight of the total of the polyethylene and maleic anhydride.

The present invention furthermore relates to a process for the preparation of the graft polymer by mixing ultra polyethylene with the alkenecarboxylic acid or alkenecarboxylic anhydride in the presence of a free-radical forming initiator, prepressing the resultant mixture under high pressure, sintering the pressed mixture at a temperature of from 200° C. to 250° C. and a pressure of from 4.0 to 20.0 MPa, and subsequently allowing the sintered mixture to cool while maintaining the pressure.

The ultra polyethylene employed is a commercially available product having a molecular weight of 1,000,000 to 10,000,000 g/mol, preferably 2,000,000 to 8,500,000 g/mol, most preferably 3,000,000 to 8,000,000 g/mol, in finely divided form, such as granules or powder. The alkenoic acid used is maleic acid, fumaric acid, itaconic acid, crotonic acid, acrylic acid, or methacrylic acid, in particular acrylic acid.

The alkenecarboxylic anhydride used is maleic, itaconic, crotonic, acrylic, or methacrylic, in particular maleic. Successful free radical-forming initiators have proven to be organic peroxides and hydroperoxides. Particular mention should be made of diacyl peroxides, peroxodicarbonates, alkyl peresters, perketals, dialkyl peroxides, dialkyl hydroperoxides, and ketone peroxides, dialkyl hydroperoxides, and ketone peroxides, in particular 2,5-dimethyl-2,5-bis(tert.-butylperoxy)-hexane and 3,3,6,6,9,9-hexamethyl-1,2,4,5-tetraoxacyclononane.

It has proven particularly expedient to add the graft monomer, namely, the alkenecarboxylic acid or anhydride, together with the free radical-forming initiator, dissolved in a suitable solvent, to the ultra polyethylene, subsequently to mix the mixture vigorously, and then to remove the solvent by evaporation.

To prepare the solution containing the alkenecarboxylic acid or alkenecarboxylic anhydride and the free radical-forming initiator, polar organic solvents having relatively low boiling points, for example aliphatic ketones having from 3 to 5 carbon atoms, aliphatic esters, or cyclic ethers, such as tetrahydrofuran or dioxane, are suitable. It has proven particularly successful to use acetone, methyl isobutyl ketone, propylene carbonate, formamide, acrylic acid esters, and methyl acetate, especially acetone, as the solvent.

This impregnation process ensures extremely uniform distribution both of the alkenecarboxylic acid or anhydride and the initiator on the base polymer. The mixture is formed by application of a pressure of 1 to 50 MPa (prepressing) and subsequently sintered by heating to 200° C. to 250° C. in particular 210° C. to 240° C. preferably 215° C. to 230° C. The pressure is 4 to 20 MPa, preferably 5 to 15 MPa, most preferably 6 to 12 MPa. It must be ensured here that sufficient time is available for the mixture to be thoroughly plasticized so that the most homogeneous graft polymer possible is produced. The sintering operation should take from 30 to 180 minutes, preferably from 40 to 120 minutes, preferably from 45 to 90 minutes, taking into account the dimensions of the shape to be produced in each case.

During sintering, it must be strictly ensured that no shear forces which result in uncontrolled degradation of the ultra polyethylene act on the material to be plasticized. For this reason, processing as described in EP-A 170 790 and U.S. Pat. No. 4,147,740 by means of a screw extruder which allows strong shear forces to act on the material is not possible. However, it is possible to carry out the shaping by extrusion using a ram extruder and avoiding shear forces during the extrusion.

As a consequence of the reaction initiated by liberated free radicals, not only is the alkenecarboxylic acid or anhydride grafted onto the ultra polyethylene, but partial crosslinking thereof also takes place. The degree of crosslinking is, as stated above, from 30 to 98%. It is not possible to measure the molecular weight of the crosslinked polyethylene by conventional measurement methods.

The degree of crosslinking of the polyethylene depends on the amount of free radical-forming initiator employed. Increasing amounts of initiator cause an increase in the degree of crosslinking, while a reduction in the amount of initiator leads to a decrease in the degree of crosslinking.

In order to ensure that the alkenecarboxylic acid or alkenecarboxylic anhydride is incorporated as fully as possible into the graft polymer, a specific amount of the free radical-forming initiator is necessary. From 0.1 to 2.0 mol, in particular from 0.3 to 1.8 mol, preferably from 0.5 to 1.5 mol, of free radical forming initiator are employed per mol of alkenecarboxylic acid or alkenecarboxylic anhydride.

The examples described below illustrate the invention without constituting limitations thereon.

EXAMPLES 1 to 4

The starting material used is an ultra polyethylene which is characterized by the following physical properties:

The density of the homogeneously pressed material, measured in accordance with DIN 53 479, is 0.93 g/cc, the viscosity number, measured in accordance with DIN 53 728 at 135° C. (concentration in decahydronaphthalene 0.0003 g/cc) is 2,300 ml/g, the mean molecular weight (computed from the Margolies equation $M = 5.37 \times 10^4 \{\eta\}^{1.49}$) is $4.4 \times 10^6$ g/mol. The melt index MFI 190/21.6 in g/10 min, determined in accordance with DIN 53 735, cannot be measured. The wear, determined by the sand slurry method (24 hours at 1,200 revolutions per minute, using quartz sand having a grain size 0.2 to 1.0 mm) is 100.

In Example 1, 90.0 parts by weight of the polyethylene characterized above is reacted with 1.0 parts by weight of maleic anhydride; in Example 2, in contrast, 97.0 parts by weight of polyethylene are reacted with 3.0 parts by weight of maleic anhydride. The free radical-forming initiator used is 2,5-dimethyl-2,5-bis(tert.-butylperoxy)hexane. A solution of 1.0 parts by weight of maleic anhydride, 0.5 parts by weight of the above-mentioned peroxide, and 3.0 parts by weight of acetone (Example 1) or 3 parts by weight of maleic anhydride, 1.5 parts by weight of peroxide, and 9.0 parts by weight of acetone (Example 2) are added to the pulverulent ultra polyethylene, and the components are mixed thoroughly using a drum mixer. The acetone is subsequently evaporated. The ultrahigh molecular weight polyethylene, soaked with maleic anhydride and peroxide, is subsequently processed and formed into shapes.

In Example 3, 99.0 parts by weight of the polyethylene characterized above is reacted with 1.0 parts by weight of maleic anhydride and, in Example 4, in contrast, 97.0 parts by weight of polyethylene are reacted with 3.0 parts by weight of maleic anhydride. The free radical-forming initiator used is 3,3,6,6,9,9-hexamethyl-1,2,4,5-tetraoxacyclononane. The further processing is carried out in a manner analogous to Example 1 for Example 3 and analogous to Example 2 for Example 4.

Forming 250 g of the polyethylene soaked with maleic anhydride and free radical-forming initiator is transferred into a circular press mold (diameter 140 mm), distributed uniformly, and subjected to a pressure of 5 MPa. The mixture is subsequently heated to 220° C. for 15 seconds, sintered for 60 minutes at 220° C. and a pressure of 5 MPa, and cooled to room temperature over the course of 30 minutes at a pressure of 10 MPa. A compact having a diameter of 140 mm and height of 20 mm is obtained.

The results of Examples 1 to 4 are given in the Table below. Example A (comparison) relates to the ultra polyethylene used as starting material.

TABLE

| Example | MAA % by weight | Peroxide Type | Peroxide % by weight | Peel Strength on aluminum (N) | Wear |
|---|---|---|---|---|---|
| 1 | 1.0 | I | 0.5 | 2.5 | 62 |
| 2 | 3.0 | I | 1.5 | 2.8 | 54 |
| 3 | 1.0 | II | 0.5 | 2.6 | 65 |
| 4 | 3.0 | II | 1.5 | 2.9 | 52 |
| A | — | — | — | 0.0 | 100 |

MAA = maleic anhydride
I = 2,5-dimethyl-2,5-bis(tert.-butylperoxy)hexane
II = 3,3,6,6,9,9-hexamethyl-1,2,4,5-tetraoxacyclononane While only a limited number of specific embodiments of the present invention have been expressly disclosed it is, nonetheless, to be broadly construed and not to be limited except by the character of the claims appended hereto.

What we claim is:

1. A graft polymer consisting essentially of 95 to 99.9 parts by weight of polyethylene having a mean average molecular weight of at least 1,000,000 g/mol as a base polymer, and 5 to 0.1 parts by weight of a graft monomer selected from the group consisting of alkenecarboxylic acid and alkenecarboxylic anhydride.

2. The polymer of claim 1 wherein said molecular weight is not more than 10,000,000 g/mol.

3. The polymer of claim 2 wherein said molecular weight is 2,000,000 to 8,500,000 g/mol.

4. The polymer of claim 3 wherein said molecular weight is 3,000,000 to 8,000,000 g/mol.

5. The polymer of claim 1 wherein said polyethylene is present in an amount of 96.0 to 99.5 parts by weight.

6. The polymer of claim 1 comprising 0.5 to 4 parts by weight of said graft monomer.

7. The polymer of claim 6 comprising 1.0 to 3.5 parts by weight of said graft monomer.

8. The graft polymer of claim 1 wherein said graft monomer is selected from the group consisting of maleic acid, fumaric acid, itaconic acid, crotonic acid, acrylic acid, methacrylic acid, maleic anhydride, itaconic anhydride, crotonic anhydride, acrylic anhydride, and methacrylic anhydride.

9. The graft polymer of claim 8 wherein said graft monomer is selected from the group consisting of acrylic acid and maleic anhydride.

10. The graft polymer of claim 9 comprising 1 to 3 parts by weight of said maleic anhydride per 100 parts by weight of said maleic anhydride and said polyethylene.

11. A process for the preparation of the graft polymer of claim 1 comprising mixing said polyethylene, said graft monomer, 0.1 to 2.0 mols of a free radical forming initiator per mol of said graft monomer to form an initial mixture, subjecting said initial mixture to a high prepressure to form a pressed mixture, sintering said pressed mixture, in the substantial absence of shear forces causing uncontrolled degradation of said polyethylene, at a sintering temperature of 200° C. to 250° C. and a sintering pressure of 4.0 to 20 MPa to form a sintered mixture, and allowing said sintered mixture to cool under said sintering pressure.

12. The process of claim 11 wherein said sintering temperature is 210° C. to 240° C. and said sintering pressure is 5 to 15 MPa.

13. The process of claim 11 wherein said graft monomer is selected from the group consisting of maleic acid, fumaric acid, itaconic acid, crotonic acid, acrylic acid, methacrylic acid, maleic anhydride, itaconic anhydride, crotonic anhydride, acrylic anhydride, and methacrylic anhydride.

14. The process of claim 13 wherein said graft monomer is selected from the group consisting of acrylic acid and maleic anhydride.

15. The process of claim 11 wherein said initiator is selected from the group consisting of organic peroxides and organic hydroperoxides.

16. The process of claim 11 wherein said graft monomer and said initiator are dissolved in a solvent to form a blend, said blend is mixed with said polyethylene, and said solvent evaporated.

17. The process of claim 16 wherein said solvent is selected from the group consisting of low boiling polar organic solvent, aliphatic esters, and cyclic ethers.

18. The process of claim 17 wherein said solvent is selected from the group consisting of aliphatic ketones having 3 to 5 carbon atoms, tetrahydrofuran, dioxane, acetone, methyl isobutyl ketone, propylene carbonate, formamide, acrylic acid esters, and methyl acetate.

19. The process of claim 18 wherein said solvent is acetone.

20. The process of claim 15 wherein said initiator is taken from the class consisting of diacyl peroxides, peroxydicarbonates, alkyl peresters, perketals, dialkyl peroxides, dialkyl hydroperoxides, and ketone peroxides.

21. The process of claim 20 wherein said initiator is selected from the group consisting of 2,5-dimethyl-2,5-bis(ter.-butylperoxy)hexane and 3,3,6,6,9,9-hexamethyl-1,2,4,5-tetraoxacyclononane.

22. The process of claim 11 wherein said prepressure is 1 to 50 MPa.

23. The process of claim 11 wherein said sintering is carried out for 30 to 180 minutes.

24. The process of claim 11 wherein there is 0.3 to 1.8 mols of said initiator per mol of said graft monomer.

* * * * *